(12) United States Patent
Park et al.

(10) Patent No.: US 10,088,035 B2
(45) Date of Patent: Oct. 2, 2018

(54) SLIDE-STEP TYPE ELECTRONIC GEAR SHIFT APPARATUS

(71) Applicants: Hyundai Motor Company, Seoul (KR); Kyung Chang Industrial Co., Ltd., Daegu (KR); Kostal Korea Co., Ltd., Seoul (KR)

(72) Inventors: Han-Gil Park, Suwon-si (KR); Jung-Hun Lee, Daegu (KR); Se-Jong Park, Seoul (KR)

(73) Assignees: Hyundai Motor Company, Seoul (KR); Kyung Chang Industrial Co., Ltd., Daegu (KR); Kostal Korea Co., Ltd., Seoul (KR)

( * ) Notice: Subject to any disclaimer, the term of this patent is extended or adjusted under 35 U.S.C. 154(b) by 381 days.

(21) Appl. No.: 14/951,188

(22) Filed: Nov. 24, 2015

(65) Prior Publication Data

US 2016/0334008 A1     Nov. 17, 2016

(30) Foreign Application Priority Data

May 11, 2015 (KR) .......................... 10-2015-0065488

(51) Int. Cl.
*F16H 59/04* (2006.01)
*F16H 59/02* (2006.01)
*F16H 63/42* (2006.01)

(52) U.S. Cl.
CPC ....... *F16H 59/044* (2013.01); *F16H 59/0204* (2013.01); *F16H 2059/0239* (2013.01); *F16H 2063/423* (2013.01)

(58) Field of Classification Search
CPC ............... F16H 59/044; F16H 59/0204; F16H 2059/0239; F16H 2063/423
See application file for complete search history.

(56) References Cited

U.S. PATENT DOCUMENTS 6,105,453 A * 8/2000 Ooyama ............... F16H 61/662
                                                  192/219.5
8,464,601 B2 * 6/2013 Giefer ..................... F16H 59/10
                                                   74/473.12

(Continued)

FOREIGN PATENT DOCUMENTS

JP          2006-177401 A     7/2006
JP          2014-31143 A      2/2014

(Continued)

*Primary Examiner* — David M Fenstermacher
(74) *Attorney, Agent, or Firm* — Morgan, Lewis & Bockius LLP

(57) ABSTRACT

An electronic gear shift apparatus may include a housing, an up switch installed in a space portion formed by opening an upper side of the housing, a down switch installed in the space portion formed by opening the upper side of the housing, and spaced apart from the up switch so as to face the up switch, a touchpad installed below the up switch and the down switch, and a gear shift stage display device installed on a surface of the housing, and displaying a position of a gear shift stage, in which when the up switch is pushed upward or the down switch is pushed downward in a state in which the finger is in contact with the touchpad, the gear shift stage may be changed in a direction of an upper gear shift stage or a lower gear shift stage of the gear shift stage display unit.

5 Claims, 4 Drawing Sheets

(56) References Cited

U.S. PATENT DOCUMENTS

| | | | |
|---|---|---|---|
| 9,538,699 B1* | 1/2017 | Bejcek | A01D 34/006 |
| 2012/0133501 A1* | 5/2012 | Walter | B60K 20/06 |
| | | | 340/456 |
| 2013/0091971 A1* | 4/2013 | Helot | B60K 20/02 |
| | | | 74/473.3 |
| 2014/0149909 A1 | 5/2014 | Montes | |
| 2015/0059510 A1* | 3/2015 | Knisely | F16H 61/0213 |
| | | | 74/473.12 |
| 2015/0135877 A1* | 5/2015 | Kim | F16H 59/0278 |
| | | | 74/473.12 |
| 2015/0167825 A1* | 6/2015 | Kim | B60K 20/02 |
| | | | 74/473.12 |
| 2015/0292614 A1* | 10/2015 | Kim | F16H 59/105 |
| | | | 74/473.12 |
| 2016/0137063 A1* | 5/2016 | Fribus | F16H 63/42 |
| | | | 74/473.12 |

FOREIGN PATENT DOCUMENTS

| | | |
|---|---|---|
| JP | 2015-62094 A | 4/2015 |
| KR | 10-1997-0000739 A | 1/1997 |
| KR | 10-0380064 B1 | 4/2003 |
| KR | 10-0946245 B1 | 3/2010 |
| KR | 10-2013-0013960 A | 2/2013 |
| KR | 10-2014-0128625 A | 11/2014 |

* cited by examiner

SLIDE-STEP TYPE ELECTRONIC GEAR SHIFT APPARATUS

CROSS-REFERENCE TO RELATED APPLICATIONS

The present application claims priority to Korean Patent Application No. 10-2015-0065488, filed May 11, 2015, the entire contents of which is incorporated herein for all purposes by this reference.

BACKGROUND OF THE INVENTION

Field of the Invention

The present invention relates to an electronic gear shift apparatus, and more particularly, to an electronic gear shift apparatus including a housing, an up switch which is installed in a space portion formed by opening an upper side of the housing, a down switch which is installed in the space portion formed by opening the upper side of the housing, and spaced apart from the up switch so as to face the up switch, a touchpad which is installed below the up switch and the down switch, and a gear shift stage display unit which is installed on a surface of the housing, and displays a position of a gear shift stage, in which when the up switch is pushed upward or the down switch is pushed downward in a state in which the finger is in contact with the touchpad, the gear shift stage is changed in a direction of an upper gear shift stage or a lower gear shift stage of the gear shift stage display unit.

Description of Related Art

In general, an electronic gear shift apparatus (shift by wire) refers to an apparatus that controls a gear shift stage of the gear shift apparatus electronically instead of mechanically, and recently, the electronic gear shift apparatus is mainly applied to high-grade vehicles or large-sized vehicles.

Various types of electronic gear shift apparatuses are being developed, and examples of the electronic gear shift apparatuses include a lever type gear shift apparatus which selects the gear shift stage using a lever, a dial type gear shift apparatus which selects the gear shift stage using a rotating dial, and a button type gear shift apparatus which selects the gear shift stage by pushing buttons.

Application of the electronic gear shift apparatus is expected to be further widened in the future, and as a result, there is a great need for developing various types of electronic gear shift apparatuses.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a slide-step type electronic gear shift apparatus, which is capable of allowing a driver to easily select a gear shift stage only with the finger, and capable of unlocking the electronic gear shift apparatus before a gear shift operation is carried out, in order to ensure stability during the gear shift operation.

According to various aspects of the present invention, an electronic gear shift apparatus may include a housing, an up switch installed in a space portion formed by opening an upper side of the housing, a down switch installed in the space portion formed by opening the upper side of the housing, and spaced apart from the up switch so as to face the up switch, a touchpad installed below the up switch and the down switch, and a gear shift stage display device installed on a surface of the housing, and displaying a position of a gear shift stage, in which when the up switch is pushed upward or the down switch is pushed downward in a state in which the finger is in contact with the touchpad, the gear shift stage is changed in a direction of an upper gear shift stage or a lower gear shift stage of the gear shift stage display unit.

Catching projections, by which the finger is caught, may be formed at a lower end of the up switch and an upper end of the down switch, respectively.

The up switch may include a slide switch operating such that a switching signal is generated when the up switch is pushed upward once, and a knob of the switch pushed upward automatically returns back, and the down switch may include a slide switch operating such that a switching signal is generated when the down switch is pushed downward once, and a knob of the switch pushed downward automatically returns back.

The touchpad may be a capacitive touchpad.

An up switch lamp, which indicates whether the up switch is operated, a down switch lamp, which indicates whether the down switch is operated, and a touchpad lamp, which indicates whether the finger is in contact with the touchpad, may be disposed in the housing.

The up switch lamp, the down switch lamp, and the touchpad lamp may be light emitting diodes (LED).

According to the slide-step type electronic gear shift apparatus of the present invention, which has the configurations as described above, the gear shift operation of the vehicle may be carried out only by one finger, thereby more easily performing the gear shift operation in comparison with the lever type, dial type, or button type gear shift apparatus in the related art.

In addition, the touch panel needs to be necessarily touched to perform the gear shift operation, thereby securely and exactly performing the gear shift operation.

In addition, the present invention is a very advanced invention in that the electronic gear shift apparatus may be installed in the vehicle while only occupying a relatively small space, such that a space in which the driver may move in the interior space of the vehicle may be enlarged, thereby improving convenience for the driver.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
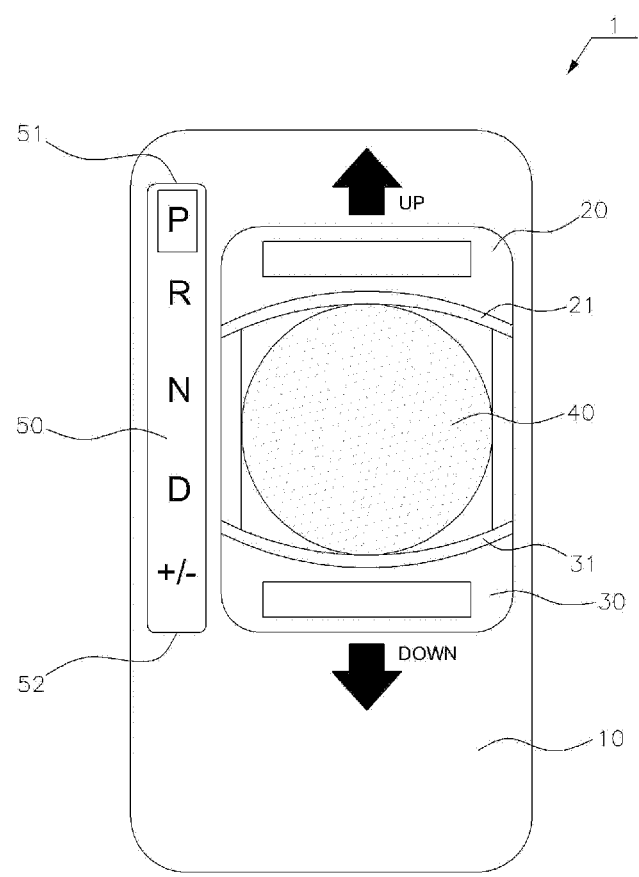
FIG. 1 is an external configuration view of an exemplary electronic gear shift apparatus according to the present invention.
Figure 2:
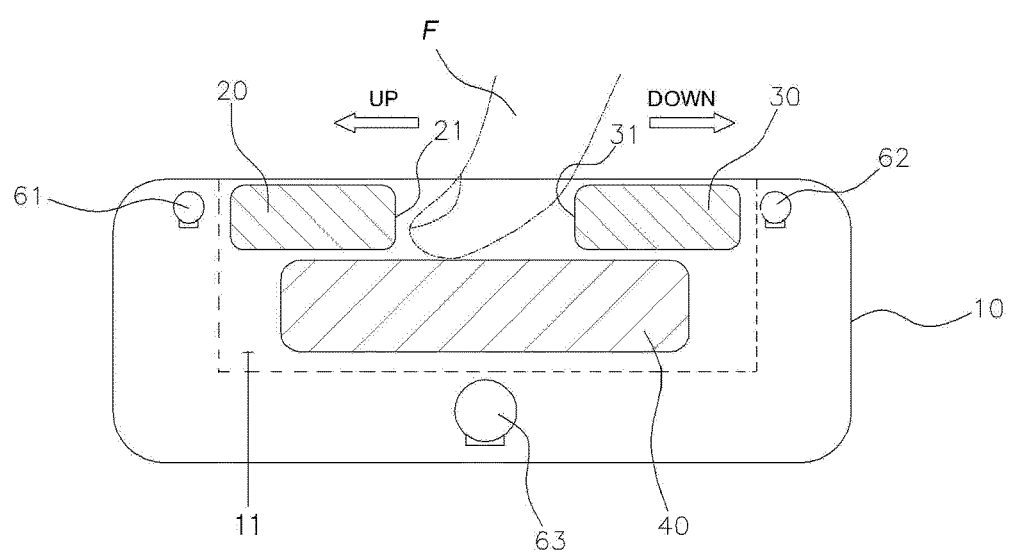
FIG. 2 is an internal configuration view of the exemplary electronic gear shift apparatus according to the present invention.

FIG. 1 is an external configuration view of an electronic gear shift apparatus according to the present invention, and FIG. 2 is an internal configuration view of the electronic gear shift apparatus according to the present invention.

Referring to the drawings, an electronic gear shift apparatus 1 according to the present invention is configured to allow a driver to select a gear shift stage only with the finger, and performs a gear shift operation in the order indicated on a gear shift stage display unit 50 in a direction of an upper gear shift stage 51 or in a direction of a lower gear shift stage 52 when the driver touches a touchpad 40 with the finger, and then pushes an up switch 20 upward or a down switch 30 downward. The configuration of the present invention will be described in more detail below.

An electronic gear shift apparatus 1 according to the present invention includes: a housing 10 which defines an external case; the up switch 20 which is installed in a space portion 11 formed by opening an upper side of the housing 10, and operated upward in a slide-step manner; the down switch 30 which is installed in the space portion 11 formed by opening the upper side of the housing 10, and spaced apart from the up switch 20 so as to face the up switch 20, and operated downward in a slide-step manner; the touchpad 40 which is installed below the up switch 20 and the down switch 30 that are installed in the space portion 11; and the gear shift stage display unit 50 which is installed on a surface of the housing 10.

In this case, catching projections 21 and 31 are formed at a lower end of the up switch 20 and an upper end of the down switch 30, respectively so that the finger is caught by the catching projections 21 and 31.

The up switch 20 is a typical slide switch operating such that a switching signal is generated when the catching projection 21 is pushed upward once, and a knob of the switch, which has been pushed upward, automatically returns back to the original position by an elastic member.

Likewise, the down switch 30 is a typical slide switch operating such that a switching signal is generated when the catching projection 31 is pushed downward once, and a knob of the switch, which has been pushed upward, automatically returns back to the original position by an elastic member.

The touchpad 40 serves to unlock the electronic gear shift apparatus according to the present invention, and the driver needs to necessarily touch the touchpad 40 with the finger in order to perform the gear shift operation using the electronic gear shift apparatus according to the present invention.

A capacitive touchpad may be employed as the touchpad 40, and in the capacitive touchpad, a transparent electric circuit, through which an electric current flows, is formed on a substrate by depositing transparent conducting oxide made of a conductive metallic material, indium-tin oxide onto both surfaces of the substrate made of glass, plastic, silicon, or the like.

The capacitive touch panel has excellent responsiveness because when the user's finger comes into contact with the surface of the touch panel, the amount of electric current flowing through the transparent electric circuit is changed due to static electricity present at the touched finger, and a control unit of the electric circuit recognizes the changed amount of electric current and exactly detects the touch of the user's finger. Accordingly, the capacitive touch panel is employed as the touchpad 40 according to the present invention, considering that the touchpad 40 serves to unlock the electronic gear shift apparatus.

However, in accordance with design intention and necessity for the electronic gear shift apparatus according to the present invention, a resistive touchpad, which recognizes the touch on the panel based on the amount of pressure applied to the surface of the panel, may be used as the touchpad 40 according to the present invention.

Furthermore, in the housing 10 of the electronic gear shift apparatus 1 according to the present invention, an up switch lamp 61, which indicates whether the up switch 20 is operated, a down switch lamp 62, which indicates whether the down switch 30 is operated, and a touchpad lamp 63, which indicates whether the finger F is in contact with the touchpad 40, are installed.

The up switch lamp 61, as the down switch lamp 62, and the touchpad lamp 63, a light emitting diode (LED) may be used.

Meanwhile, gear shift stages of a parking stage P, a reverse stage R, a neutral stage N, a drive stage D, and manual gear shift stage adjustment (+/−) are sequentially indicated on the gear shift stage display unit 50 are marked in the form of letters or symbols. For convenience, in the specification of the present invention, a portion on which the parking stage P is marked is referred to as the upper display unit 51, and a portion on which the manual gear shift stage adjustment (+/−) is marked is referred to as the lower display unit 52.

The gear shift stage display unit 50 displays the current gear shift position of the vehicle, and in the specification of the present invention, the displays of the gear shift stages vary in accordance with switching operations of the up switch 20 and the down switch 30.

Figure 3:
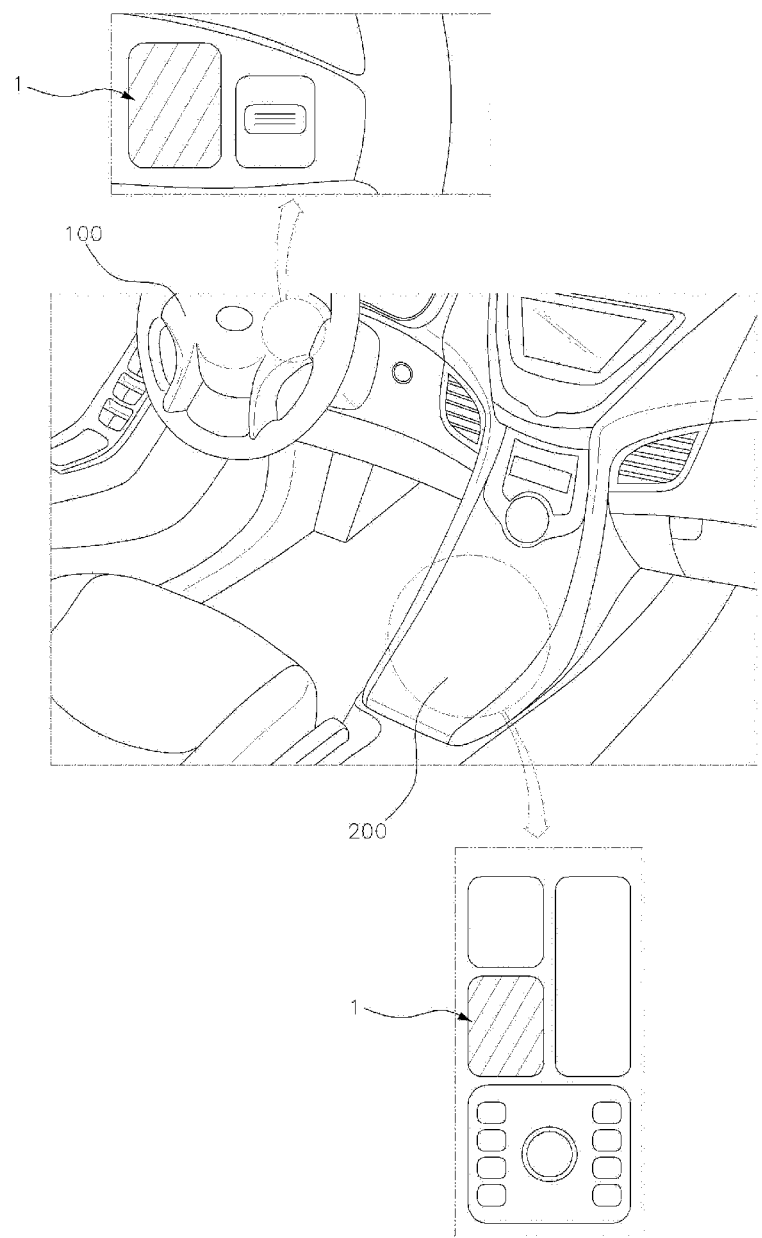
FIG. 3 is a view illustrating a state in which the exemplary electronic gear shift apparatus according to the present invention is installed.

FIG. 3 is a view illustrating a state in which the electronic gear shift apparatus according to the present invention is installed. As illustrated in FIG. 3, the electronic gear shift apparatus 1 according to the present invention may be basically installed on a console 200 disposed below a driver seat in the vehicle, but may be additionally installed at a part of a steering wheel 100 in the vehicle.

An operation of the slide-step type electronic gear shift apparatus according to the present invention, which is configured as described above, will be described with reference to the aforementioned FIGS. 1 and 2.

First, in order to perform the gear shift operation for the vehicle using the electronic gear shift apparatus 1 according to the present invention, the driver needs to touch the touchpad 40 of the electronic gear shift apparatus 1 according to the present invention with the finger F so as to release a locked state (also called a 'locking state') of the electronic gear shift apparatus 1 according to the present invention.

To this end, the driver of the vehicle touches the touchpad 40 of the electronic gear shift apparatus 1 according to the present invention with the finger F.

Then, the touchpad lamp 63 is turned on, and when the driver pushes upward the catching projection 21 of the up switch 20 with the finger F that is in touch with the touchpad 40, the lamp 61 of the up switch 20 is turned on, and at the same time, a switching signal of the up switch 20 is generated, such that the gear shift operation is carried out from a position of the current gear shift stage to a position of a gear shift stage that is positioned upward by one stage in the direction of the upper display unit 51 of the gear shift stage display unit 50. At this time, the letters or symbols, which indicate the gear shift stage after the gear shift operation, may be displayed brightly on the gear shift stage display unit 50 so as to distinguish the current gear shift stage from other gear shift stages.

Likewise, when the driver pushes downward the catching projection 31 of the down switch 30 with the finger F that is in touch with the touchpad 40, the lamp 62 of the down switch 30 is turned on, and at the same time, a switching signal of the down switch 30 is generated, such that the gear shift operation is carried out from a position of the current gear shift stage to a position of a gear shift stage that is positioned downward by one stage in the direction of the lower display unit 52.

The operation of changing the gear shift stages is not carried out in a state in which the touchpad 40 is not touched first even though the up switch 20 or the down switch 30 is operated, such that the touchpad 40 performs an unlocking function that releases the locked state of the gear shift stage.

For example, in order for the driver to drive the vehicle, which is parked currently, the gear shift operation is carried out from the upper display unit 51 of the gear shift stage display unit 50 on which the parking stage P is displayed to the lower display unit 52 on which the drive stage D is displayed, and for this purpose, the gear shift stage is changed from the parking stage P to the reverse stage R when the driver pushes the down switch 30 downward once in a state in which the touchpad 40 is touched with the finger F, the gear shift stage is changed from the reverse stage R to the neutral stage N when the driver pushes the down switch 30 downward once more, and the gear shift stage is changed from the neutral stage N to the drive stage D when the driver pushes the down switch 30 downward once more in this state. Further, when the finger F is separated from touchpad 40 after the gear shift stage is changed to the drive stage D, the drive stage D is selected as the gear shift stage such that the vehicle may be driven.

Meanwhile, the gear shift stage may be changed so that a hold function is applied to the above processes. That is, in a case in which the gear shift stage is changed from the reverse stage R to the drive stage D or in a case in which the gear shift stage is changed from the drive stage D to the reverse stage R, when the driver pushes the up switch 20 or the down switch 30 for a predetermined time or more in a state in which the touchpad 40 is touched, the gear shift stage may be changed from the reverse stage R directly to the drive stage D, or from the drive stage D directly to the reverse stage R without being changed to the neutral stage N.

Figure 4:
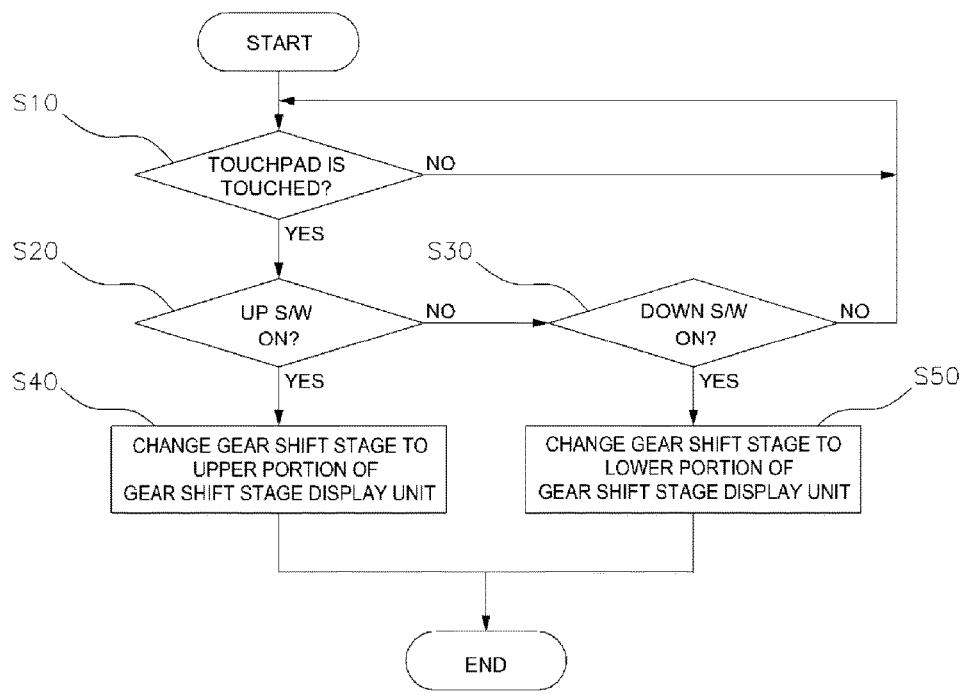
FIG. 4 is a flowchart illustrating a process of controlling the exemplary electronic gear shift apparatus according to the present invention.

FIG. 4 is a flowchart illustrating a process of controlling the electronic gear shift apparatus according to the present invention which is operated as described above.

First, in order to perform the gear shift operation using the electronic gear shift apparatus 1 according to the present invention, an electronic control unit (ECU) of the vehicle determines whether the touchpad 40 of the gear shift apparatus according to the present invention is touched with the finger (S10).

At this time, in a case in which the driver touches the touchpad 40 with the finger F in order to change the gear shift stage, the driver pushes the up switch 20 upward and determines whether the up switch 20 is turned on (S20), and when the up switch 20 is turned on, the driver changes the gear shift stage from the current gear shift stage in the direction of the upper display unit 51 of the gear shift stage display unit 50 (S40).

In contrast, in step S20, in a case in which the up switch 20 is not turned on, the electronic control unit (ECU) determines whether the driver pushes the down switch 30 downward and the down switch 30 is turned on (S30), and when the down switch 30 is turned on, and the electronic control unit (ECU) changes the gear shift stage from the current gear shift stage in the direction of the lower display unit 52 of the gear shift stage display unit 50 (S50).

Thereafter, the electronic gear shift apparatus according to the present invention performs the gear shift operation of the vehicle while being operated in accordance with the above order until an engine of the vehicle is stopped.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An electronic gear shift apparatus comprising:
  a housing;
  an up switch installed in a space portion formed by opening an upper side of the housing;

a down switch installed in the space portion formed by opening the upper side of the housing, and spaced apart from the up switch so as to face the up switch;

a touchpad installed below the up switch and the down switch; and a gear shift stage display device installed on a surface of the housing, and displaying a position of a gear shift stage, wherein when the up switch is pushed upward or the down switch is pushed downward in a state in which a finger is in contact with the touchpad, the gear shift stage is changed in a direction of an upper gear shift stage or a lower gear shift stage of the gear shift stage display device, wherein the up switch comprises a slide switch operating such that a switching signal of the up switch is generated when the up switch is pushed upward once, and a knob of the up switch pushed upward automatically returns back, and the down switch comprises a slide switch operating such that a switching signal of the down switch is generated when the down switch is pushed downward once, and a knob of the down switch pushed downward automatically returns back.

2. The electronic gear shift apparatus of claim 1, wherein catching projections, by which the finger is caught, are formed at a lower end of the up switch and an upper end of the down switch, respectively.

3. The electronic gear shift apparatus of claim 1, wherein the touchpad comprises a capacitive touchpad.

4. The electronic gear shift apparatus of claim 1, wherein an up switch lamp, which indicates whether the up switch is operated, a down switch lamp, which indicates whether the down switch is operated, and a touchpad lamp, which indicates whether the finger is in contact with the touchpad, are disposed in the housing.

5. The electronic gear shift apparatus of claim 4, wherein the up switch lamp, the down switch lamp, and the touchpad lamp comprise light emitting diodes (LED).

* * * * *